United States Patent
Hintzer et al.

(10) Patent No.: US 12,116,476 B2
(45) Date of Patent: Oct. 15, 2024

(54) LATEX BLENDS OF AMORPHOUS PERFLUORINATED POLYMERS AND ARTICLES DERIVED THEREFROM

(71) Applicant: 3M INNOVATIVE PROPERTIES COMPANY, St. Paul, MN (US)

(72) Inventors: Klaus Hintzer, Kastl (DE); Tamon Aoki, Tokyo (JP); Tatsuo Fukushi, Woodbury, MN (US); Florian D. Jochum, Ingelheim (DE); Peter J. Scott, Stillwater, MN (US); Yuta Suzuki, Kanagawa (JP); Karl D. Weilandt, Afton, MN (US); Steffen Vowinkel, Mühldorf am Inn (DE)

(73) Assignee: 3M Innovative Properties Company, St. Paul, MN (US)

( * ) Notice: Subject to any disclaimer, the term of this patent is extended or adjusted under 35 U.S.C. 154(b) by 603 days.

(21) Appl. No.: 17/413,053

(22) PCT Filed: Dec. 19, 2019

(86) PCT No.: PCT/US2019/067422
§ 371 (c)(1),
(2) Date: Jun. 11, 2021

(87) PCT Pub. No.: WO2020/132213
PCT Pub. Date: Jun. 25, 2020

(65) Prior Publication Data
US 2022/0033635 A1 Feb. 3, 2022

Related U.S. Application Data

(60) Provisional application No. 62/782,382, filed on Dec. 20, 2018.

(51) Int. Cl.
| | | |
|---|---|---|
| C08L 27/18 | (2006.01) | |
| B29B 9/08 | (2006.01) | |
| C08F 214/26 | (2006.01) | |
| C08F 214/28 | (2006.01) | |
| C08L 19/02 | (2006.01) | |
| C08L 27/20 | (2006.01) | |
| B29K 19/00 | (2006.01) | |

(52) U.S. Cl.
CPC ............... *C08L 27/18* (2013.01); *B29B 9/08* (2013.01); *C08F 214/262* (2013.01); *C08F 214/282* (2013.01); *C08L 19/02* (2013.01); *C08L 27/20* (2013.01); *B29K 2019/00* (2013.01)

(58) Field of Classification Search
CPC .......... C08L 27/18; C08L 19/02; C08L 27/20; C08F 214/262; C08F 214/282
See application file for complete search history.

(56) References Cited

U.S. PATENT DOCUMENTS

| | | |
|---|---|---|
| 4,115,481 A | 9/1978 | Finlay |
| 4,281,092 A | 7/1981 | Breazeale |
| 4,520,170 A | 5/1985 | Kitto |
| 4,713,418 A | 12/1987 | Logothetis |
| 4,879,362 A | 11/1989 | Morgan |
| 4,904,726 A | 2/1990 | Morgan |
| 5,006,594 A | 4/1991 | Rees |
| 5,225,504 A | 7/1993 | Tatsu |
| 5,565,512 A | 10/1996 | Saito |
| 5,576,402 A | 11/1996 | Felix |
| 5,621,145 A | 4/1997 | Saito |
| 5,700,879 A | 12/1997 | Yamamoto |
| 5,767,204 A | 6/1998 | Iwa |
| 6,114,452 A | 9/2000 | Schmiegel |
| 6,172,162 B1 | 1/2001 | Mouri |
| 6,281,296 B1 | 8/2001 | MacLachlan |
| 6,310,141 B1 | 10/2001 | Chen |
| 6,310,142 B1 | 10/2001 | Apostolo |
| 6,395,834 B1 | 5/2002 | Albano |
| 6,657,012 B2 | 12/2003 | Grooteart |
| 6,657,013 B2 | 12/2003 | Grootaert |
| 6,734,254 B1 | 5/2004 | Worm |
| 6,794,457 B2 | 9/2004 | Grootaert |
| 6,844,388 B2 | 1/2005 | Grootaert |
| 6,846,880 B2 | 1/2005 | Grootaert |
| 6,884,847 B2 | 4/2005 | Irie |
| 6,890,995 B2 | 5/2005 | Kolb |
| 7,019,083 B2 | 3/2006 | Grootaert |

(Continued)

FOREIGN PATENT DOCUMENTS

| | | |
|---|---|---|
| CN | 103588921 A | 2/2014 |
| EP | 0661304 | 7/1995 |
| EP | 0708797 | 5/1996 |
| EP | 0769521 | 4/1997 |
| EP | 0784064 | 7/1997 |
| EP | 1262518 | 12/2002 |

(Continued)

OTHER PUBLICATIONS

Dyneon, "TFM 2001 Z PTFE, Technical Information", 2001 2 pages.
Sperati, "Fluorine-containing polymers. II.Polytetrafluoroethylene", Fortschr Hochpolym Forch, 1961, pp. 465-495.
Wang, "Perfluoroelastomer and fluoroelastomer seals for semiconductor wafer processing equipment", Journal of fluorine chemistry, 2003, vol. 122, pp. 113-119.
International Search report for PCT International Application No. PCT/US2019/067422 mailed on Mar. 12, 2020, 4 pages.

*Primary Examiner* — Ling Siu Choi
*Assistant Examiner* — Olga Lucia Donahue
(74) *Attorney, Agent, or Firm* — Julie Lapos-Kuchar

(57) ABSTRACT

Described herein is a latex blend comprising (i) an amorphous perfluoropolymer and (ii) an aqueous dispersion of semi crystalline fluoropolymer particles, wherein the particles comprise a TFE homopolymer or a TFE copolymer comprising no more than 1 wt % of a second fluorinated monomer, wherein the semi crystalline fluoropolymer particles (a) have an MFI (372° C. with 2.16 kg) of less than 50 g/10 min or (b) are not melt processible and have an SSG of less than 2.190, wherein the semi crystalline fluoropolymer particles have an average diameter greater than 100 nm.

12 Claims, No Drawings

(56) References Cited

U.S. PATENT DOCUMENTS

| | | |
|---|---|---|
| 7,294,677 B2 | 11/2007 | Grootaert |
| 7,354,974 B2 | 4/2008 | Takahashi |
| 9,458,314 B2 | 10/2016 | Usami |
| 2002/0177664 A1 | 11/2002 | Albano |
| 2011/0269909 A1 | 11/2011 | Bish |
| 2016/0137828 A1 | 5/2016 | Gurevich |
| 2018/0201708 A1 | 7/2018 | Yagi et al. |
| 2019/0185599 A1 | 6/2019 | Hintzer |

FOREIGN PATENT DOCUMENTS

| | | |
|---|---|---|
| JP | 2011-504531 A | 2/2011 |
| TW | 201730224 A | 9/2017 |
| WO | WO 2008-130557 | 10/2008 |
| WO | 2009/065895 A1 | 5/2009 |
| WO | WO 2020-132203 | 6/2020 |

LATEX BLENDS OF AMORPHOUS PERFLUORINATED POLYMERS AND ARTICLES DERIVED THEREFROM

TECHNICAL FIELD

A latex blend comprising amorphous perfluoropolymers and an aqueous dispersion of modified polytetrafluoroethylene (PTFE) are disclosed. Such blends can be used to make a filled perfluorinated elastomer, which can have improved plasma resistance and/or temperature stability.

SUMMARY

There is a desire to identify a filled perfluorinated elastomeric composition, which has improved properties such as, heat resistance, and/or plasma resistance.

In one aspect, a latex blend is disclosed, comprising an amorphous perfluoropolymer latex and an aqueous dispersion of semi crystalline fluoropolymer particles, wherein the semi crystalline fluoropolymer particles comprise a tetrafluoroethylene copolymer comprising no more than 1 wt % of at least one additional fluorinated monomer, wherein the semi crystalline fluoropolymer particles (i) have an MFI (372° C. with 2.16 kg) of less than 50 g/10 min or (ii) are not melt processable and have an SSG of less than 2.200, wherein the semi crystalline fluoropolymer particles have an average diameter greater than 100 nm.

In one aspect, a curable perfluoropolymer composition is disclosed comprising a homogeneous blend of an amorphous perfluoropolymer particles and semi crystalline fluoropolymer particles, wherein the semi crystalline fluoropolymer particles comprise a tetrafluoroethylene copolymer comprising no more than 1 wt % of at least one additional fluorinated monomer, wherein the semi crystalline fluoropolymer particles (a) have an MFI (372° C. with 2.16 kg) of less than 50 g/10 min or (b) are not melt processable and have an SSG of less than 2.200, and wherein the semi crystalline fluoropolymer particles have an average diameter greater than 100 nm.

In another aspect, a cured perfluorinated elastomer is disclosed comprising a perfluoropolymer filled with semi crystalline fluoropolymer particles, wherein the semi crystalline fluoropolymer particles comprise a tetrafluoroethylene copolymer comprising no more than 1 wt % of at least one additional fluorinated monomer, wherein the semi crystalline fluoropolymer particles (a) have an MFI (372° C. with 2.16 kg) of less than 50 g/10 min or (b) are not melt processable and have an SSG of less than 2.200, and wherein the semi crystalline fluoropolymer particles have an average diameter greater than 100 nm.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B);
"backbone" refers to the main continuous chain of the polymer;
"crosslinking" refers to connecting two pre-formed polymer chains using chemical bonds or chemical groups;
"cure site" refers to functional groups, which may participate in crosslinking;
"interpolymerized" refers to monomers that are polymerized together to form a polymer backbone;
"monomer" is a molecule which can undergo polymerization which then form part of the essential structure of a polymer; and
"polymer" refers to a macrostructure comprising repeating interpolymerized monomeric units.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

The present application is directed toward amorphous perfluorinated polymers, which are used in making perfluorinated elastomers. Perfluorinated elastomers are used in a wide variety of applications in which severe environments are encountered, specifically end uses where exposure to high temperatures and aggressive chemicals occur. In the semiconductor industry, perfluorinated elastomers are used in processes that require resistance to $NF_3$ plasma. However, this industry has stringent requirements on material purity especially around metal ions.

High fluorine content polymers can be used as fillers to provide the base polymer with improved performance (such as thermal stability, plasma resistance, etc.). PTFE and PFA polymers are both high fluorine content polymers. Traditionally, PFA (perfluoroalkoxy copolymers) polymers have been used as a filler in perfluorinated elastomeric articles for semiconductor use because PFA is a thermoplastic resin, which can be melt-processed, making it easy to work it. Although the incorporation of PTFE (TFE homopolymer) would be ideal to add to the amorphous perfluoropolymer, since it has excellent thermal and chemical stability, as shown in the Example Section, unmodified PTFE has a tendency to fibrillate, causing a rough appearance in the final product.

Modified PTFE is a tetrafluoroethylene (TFE) copolymer with low amounts of comonomer. The present disclosure is directed toward a latex blend comprising an amorphous perfluorinated polymer and an aqueous dispersion of semi crystalline fluoropolymer particles of TFE copolymers comprising a small concentration of comonomer.

Semi Crystalline Fluoropolymer Particles

The particles of the present disclosure are semi crystalline fluoropolymer particles of TFE copolymer. The TFE copolymer disclosed herein is a polymer of TFE modified with minor amounts, e.g., no more than 1, 0.5, 0.1, 0.05 or even 0.01 wt % of at least one additional fluorinated monomer, which is not TFE. Exemplary additional fluorinated monomers include a perfluorinated ether of the formula

$R_f$—O—$(CF_2)_m$CF=$CF_2$ wherein m is 0 or 1 and Rf represents a perfluoroalkyl residue containing at least 1 carbon atoms which may be interrupted by at least one catenated (i.e., in-chain) oxygen atom. Exemplary unsaturated fluorinated ether monomers include perfluoro(2-propoxypropyl vinyl) ether (PPVE-2), perfluoro(methyl vinyl) ether (PMVE), perfluoro(ethyl vinyl) ether (PEVE), perfluoro(3-methoxy-n-propyl vinyl) ether (MV-31), perfluoro(2-methoxy-ethyl vinyl) ether, perfluoro(n-propyl vinyl) ether (PPVE-1), perfluoro(methyl allyl) ether (MA-1), perfluoro(ethyl allyl) ether (MA-2), perfluoro(n-propyl allyl) ether (MA-3), perfluoro(n-butyl allyl) ether (MA-4), $CF_3$—O—$(CF_2)_3$—O—$CF_2$—CF=$CF_2$ (MA31) and $F_3C$—$(CF_2)_2$—O—$CF(CF_3)$—$CF_2$—O—$CF(CF_3)$—$CF_2$—O—CF=$CF_2$ (PPVE-3).

In one embodiment, the TFE copolymer is modified with perfluorinated vinylethers or perfluorinated allylethers to achieve a low deformation under load. In one embodiment, the TFE copolymer is modified with minor amounts of perfluorinated allyl ether monomers. In one embodiment, the semi crystalline fluoropolymer particles comprise a group, for example nitrile, bromine, and/or iodine sites, which can interact (for example, binding interaction) with the amorphous perfluoropolymer. Such groups may be introduced into the semi crystalline fluoropolymer via a chain transfer agent or cure sites monomer used during polymerization.

In one embodiment, the semi crystalline fluoropolymer particle is a random co-polymer made by copolymerizing tetrafluoroethylene with a different fluorinated monomer, such as a perfluorinated allyl or vinyl ether.

In another embodiment, the semi crystalline fluoropolymer particle is a core-shell particle comprising a core of one composition (such as TFE homopolymer or TFE copolymer) and a shell of a different composition (for example a shell derived from different monomers or a different concentration of monomers than the core). In the instance of a core-shell particle, typically the core has an average diameter of at least 10, 25, or even 40 nm and at most 100, 125, or even 150 nm. The shell may be thick or thin. For example, in one embodiment, the outer shell is a TFE copolymer, having a thickness of at least 100, or even 125 nm and at most 200 nm. In another embodiment, the outer shell is a TFE copolymer having a thickness of at least 1, 2, or even 5 nm and at most 15, or even 20 nm. Exemplary modified PTFE core-shell particles have a shell derived from a perfluorinated vinyl ether, a perfluorinated allyl ether, and/or a cure-site containing monomer. The overall content of the modifier (for example perfluorinated vinyl ether, perfluorinated allyl ether, and cure-site containing monomer) is, on average, less than 1, 0.5, or even 0.2 wt % of the weight of the particle. In one embodiment, the content of the second monomer in the semi crystalline fluoropolymer particle is about 1000 parts per million.

The above-mentioned semi crystalline fluoropolymers can be made using techniques known in the art, for example, by aqueous emulsion polymerization with or without fluorinated emulsifiers; followed by coagulation of the latex, agglomeration and drying to harvest the semi crystalline fluoropolymer.

The semi crystalline fluoropolymer disclosed herein are particles. In one embodiment, the average primary particle size of the particles in the latex is at least 50, 75, 100, or even 125 nm and at most 200, 250, 300, 400, or even 500 nm. These primary particles may be agglomerated together forming an agglomerate having an average diameter of at least 50, 75, 100, or even 125 micrometers and at most 500, 600, 800, or even 1000 micrometers.

The semi crystalline fluoropolymer particles may be melt processible or not melt processible.

The melt-processible semi crystalline fluoropolymer particles are those materials having a low molecular weight. Such low molecular weight polymers have an MFI (melt flow index) at 372° C. and 2.16 kg of load of less than 50, 45, or even 40 g/10 min. Exemplary melt-processible semi crystalline fluoropolymer particles include core-shell particles derived from a fluorinated vinyl ether (e.g. PPVE, PMVE) or fluorinated allyl ether, as a modifier in the shell and/or the core.

The semi crystalline fluoropolymer particles having a higher molecular weight fluoropolymer are essentially non-melt processible (having a melt flow index of less than 0.1, 0.05, or even 0.001 g/10 min at 372° C., 21.6 kg). The molecular weight of these non-melt-processible polymers cannot be measured by convention techniques. Thus, an indirect method that correlates with molecular weight, such as standard specific gravity (SSG) is used. The lower the SSG value, the higher the average molecular weight. The SSG of the non-melt processible semi crystalline fluoropolymers of the present disclosure, is at most 2.200, 2.190, 2.185, 2.180, 2.170, 2.160, 2.157, 2.150, 2.145 or even 2.130 $g/cm^3$ as measured according to ASTM D4895-04. Exemplary non melt-processible semi crystalline fluoropolymer particles include core-shell particles derived from a vinyl ether or allyl ether, e.g. PPVE, PMVE, as a modifier in the shell and/or the core, and random copolymer particles derived from a nitrile-containing cure-site monomer.

In one embodiment, the semi crystalline fluoropolymer particles have a melting point of at least 310, 320, or even 330° C., which can be determined by analyzing the coagulated and dried fluoropolymer.

Amorphous Perfluoropolymer

The amorphous perfluoropolymer is a macromolecule comprising interpolymerized repeating divalent monomeric units, wherein each of the monomeric units is perfluorinated (in other words, the monomeric unit comprises at least one C—F bond and no C—H bonds). The amorphous perfluoropolymer may comprise terminal groups that are not perfluorinated based on the initiator and/or chain transfer agent, used as is known in the art.

The amorphous perfluoropolymer is obtained generally by polymerizing one or more types of perfluorinated monomers such as perfluorinated olefins and perfluorinated olefins comprising ether linkages. Exemplary perfluorinated monomers include: tetrafluoroethylene, hexafluoropropylene, pentafluoropropylene, trifluorochloroethylene, perfluoro ether monomer such as perfluoro vinyl ether monomers and perfluoro allyl ether monomers.

Examples of perfluoro ether monomers that can be used in the present disclosure include those that correspond to the formula: $CF_2$=$CF(CF_2)_m$—O—$R_f$ wherein m is 0 or 1 and $R_f$ represents a perfluorinated aliphatic group that may contain no, one or more oxygen atoms and up to 12, 10, 8, 6 or even 4 carbon atoms.

Exemplary perfluorinated vinyl ether monomers correspond to the formula: $CF_2$=$CFO(R^a_fO)_n(R^b_fO)_mR^e_f$ wherein $R^a_f$ and $R^b_f$ are different linear or branched perfluoroalkylene groups of 1-6 carbon atoms, in particular 2-6 carbon atoms, m and n are independently 0-10 and $R^e_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, and $CF_3$—$(CF_2)_2$—O—$CF(CF_3)$—$CF_2$—O—$CF(CF_3)$—$CF_2$—O—CF=$CF_2$.

Examples of perfluoroallyl ether monomers that can be used in the present disclosure include those that correspond to the formula: $CF_2$=$CF(CF_2)$—O—$R_f$ wherein $R_f$ represents a perfluorinated aliphatic group that may contain no, one or more oxygen atoms and up to 10, 8, 6 or even 4 carbon atoms. Specific examples of perfluorinated allyl ethers include: $CF_2=CF-CF_2-O-(CF_2)_nF$ wherein n is an integer from 1 to 5, and $CF_2=CF-CF_2-O-(CF_2)_x-O-(CF_2)_y-F$ wherein x is an integer from 2 to 5 and y is an integer from 1 to 5. Specific examples of perfluorinated allyl ethers include perfluoro (methyl allyl) ether $(CF_2=CF-CF_2-O-CF_3)$, perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3-(CF_2)_2-O-CF(CF_3)-CF_2-O-CF(CF_3)-CF_2-O-CF_2CF=CF_2$, and combinations thereof.

In the present disclosure, the perfluorinated polymer may be polymerized in the presence of a chain transfer agent and/or cure site monomers to introduce cure sites such as I, Br, and/or CN, into the fluoropolymer.

Exemplary chain transfer agents include: an iodo-chain transfer agent, a bromo-chain transfer agent, or a chloro-chain transfer agent. For example, suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound, such as $I(CF_2)_n-O-(CF_2)_m-I$, wherein n and m are integers independently selected from 1, 2, 3, 4, 5, 6, 7, 8, 9, 10, or even 12. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutane, and mixtures thereof. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

In one embodiment, the cure sites may be derived from one or more monomers of the formula: (a) $CX_2=CX(Z)$, wherein: (i) X each is independently H or F; and (ii) Z is I, Br, $R_f-U$ wherein U=I or Br and $R_f$=a perfluorinated alkylene group optionally containing O atoms or (b) $Y(CF_2)_qY$, wherein: (i) Y is Br or I or Cl and (ii) q=1-6. In addition, non-fluorinated bromo- or iodo-olefins, e.g., vinyl iodide and allyl iodide, can be used. In some embodiments, the cure site monomers are derived from one or more compounds selected from the group consisting of $CF_2=CFCF_2I$, $ICF_2CF_2CF_2CF_2I$, $CF_2=CFCF_2CF_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3-OCF_2CF_2I$, $CF_2=CFCF_2Br$, $CF_2=CFOCF_2CF_2Br$, $CF_2=CFCl$, $CF_2=CFCF_2Cl$, and combinations thereof.

In another embodiment, the cure site monomers comprise nitrogen-containing cure moieties. Useful nitrogen-containing cure site monomers include nitrile-containing fluorinated olefins and nitrile-containing fluorinated vinyl ethers, such as: perfluoro(8-cyano-5-methyl-3,6-dioxa-1-octene); $CF_2=CFO(CF_2)_LCN$ wherein L is an integer from 2 to 12; $CF_2=CFO(CF_2)_uOCF(CF_3)CN$ wherein u is an integer from 2 to 6; $CF_2=CFO[CF_2CF(CF_3)O]_q(CF_2O)_yCF(CF_3)CN$ or $CF_2=CFO[CF_2CF(CF_3)O]_q(CF_2)_yOCF(CF_3)CN$ wherein q is an integer from 0 to 4 and y is an integer from 0 to 6; or $CF_2=CF[OCF_2CF(CF_3)]_q(CF_2)_rCN$ wherein r is 1 or 2, and t is an integer from 1 to 4; and derivatives and combinations of the foregoing. Examples of a nitrile-containing cure site monomer include $CF_2=CFO(CF_2)_5CN$, $CF_2=CFOCF_2CF(CF_3)OCF_2CF_2CN$, $CF_2=CFOCF_2CF(CF_3)OCF_2CF(CF_3)CN$, $CF_2=CFOCF_2CF_2CF_2OCF(CF_3)CN$, $CF_2=CFOCF_2CF(CF_3)OCF_2CF_2CN$; and combinations thereof.

In one embodiment, the amorphous perfluoropolymer comprises Br and/or I cure sites and is substantially free of nitrile cure sites, meaning it comprises less than 0.5, 0.1, or even 0.01 wt % or even no detectable levels of the nitrile cure site versus total weight of the amorphous perfluoropolymer.

The amorphous perfluoropolymer is a latex, comprising a plurality of amorphous perfluoropolymer particles in an aqueous continuous phase. In one embodiment, the amorphous perfluoropolymer particles have an average particle size of at least 50, 60, 70, 80, or even 90 nm; and at most 120, 140, 150, 16, 18, or even 200 nm.

Blends

The latex blend disclosed herein comprises an aqueous dispersion of the amorphous perfluoropolymer which is blended with an aqueous dispersion of the semi crystalline fluoropolymer particles.

Typically, the aqueous dispersion of the semi crystalline fluoropolymer particles has a solids content of at least 10, 15 or even 20 wt % and at most 30, 35, or even 40 wt %.

Typically, the aqueous dispersion of the amorphous perfluoropolymer has a solids content of at least 10, 15, 20, or even 25 wt %.

The two aqueous dispersions are contacted together and then blended using techniques known in the art such as low shear to prevent coagulation. In one embodiment, the latex blend comprises at least 5, 10, 15, 20 or even 25% by weight and no more than 30, 40, or even 50% by weight of the semi crystalline fluoropolymer particles per the amorphous perfluoropolymer.

In one embodiment, the latex blend has a total solids content of at least 10, 15, 20, 25, 30, or even 40% by weight.

After homogeneously blending the dispersions, the latex blend can be coagulated using traditional physical and chemical methods. In physical methods the dispersion may be subject to strong (high) shearing using a stirring device thereby coagulating the particles, (typically by rotor stator having shear rates in excess of 1000 (1/s)). Another method of physical coagulation is the freeze-thaw method. The dispersion is cooled sufficiently to freeze it, which destabilizes the dispersion so that on thawing, the coagulate separates from the liquid. Generally, this technique is not preferred for scale-up due to the scaling ability and intensive energy requirements. In chemical coagulation, an electrolyte or inorganic salt is added to the dispersion so that the stability of the dispersion is decreased thereby causing coagulation.

In one embodiment, it may be preferable to use the chemical coagulation method wherein an electrolyte or inorganic salt is added to the polymer dispersion. Examples of electrolytes used to chemically coagulate fluoropolymer primary particles include HCl, $H_2SO_4$, $HNO_3$, $H_3PO_4$, $Na_2SO_4$, $MgCl_2$, $Al_2(SO_4)_3$, and ammonium carbonate. Among these compounds, it is preferable to use compounds which can volatize during the process of drying the coagulate. Examples of inorganic salts used to chemically coagulate fluoropolymer primary particles include alkali metal salts, alkaline earth metal salts, and ammonium salts, of nitric acid, hydrohalic acid, phosphoric acid, sulfuric acid, molybdate, monobasic or dibasic sodium phosphate, ammonium bromide, potassium chloride, calcium chloride, copper chloride and calcium nitrate. These electrolytes and inorganic salts may be used independently or in combinations of two or more. In one preferred embodiment, an acid, such as $HNO_3$, is used to coagulate the latex blend.

After coagulation, the collected solids (herein referred to as the agglomerated fluoropolymer blend, which comprises the semi crystalline fluoropolymer particles and the amorphous perfluoropolymer) can be rinsed, dried (for examples at temperatures of 90° C. and above), and processed using techniques known in the art. For example, the blend of amorphous perfluoropolymer with semi crystalline fluoropolymer particles can be compounded using standard mixing equipment for dry blending components. Exemplary mixing techniques include, for example, kneading with use of a twin roll for rubber, a pressure kneader or a Banbury mixer. As used herein dry blending is meant blending together ingredients which contain little, if any, water or solvent, as opposed to latex, liquid dispersion or solution blending wherein significant quantities or water or solvent are present. Optionally fillers and/or cure catalyst may be added.

Ideally, the semi crystalline fluoropolymer particles should have good compatibility with amorphous perfluoropolymer latex to enable a filled perfluorinated elastomeric composition having good aesthetics (for example a smooth and/or non-fibrillated product).

In one embodiment, the addition of the aqueous dispersion of semi crystalline fluoropolymer particles to the amorphous perfluoropolymer latex results in an agglomerated fluoropolymer blend having a melting point that is at least 1.5, 2.0, 2.5, 3.0, 4.0. 5.0, 6.0, 8.0, or even 10.0° C. lower than the melting point of the semi crystalline fluoropolymer particles itself. In one embodiment, the agglomerated fluoropolymer blend has a melting point of at least 310, 320, 322, 324, or even 326° C. In one embodiment, the agglomerated fluoropolymer blend has a melting point of at most 325, 326, 327, 328, or even 329° C.

The stability of the composition may be determined by analyzing the agglomerated fluoropolymer blend using Thermogravimetry Analysis measuring the weight versus temperature. The derivative of this curve is then used to determine at what temperature the inflection occurs. The inflection point temperature can be interpreted as the starting temperature of degradation of the semi-crystalline fluoropolymer. In one embodiment, the agglomerated fluoropolymer blend has an inflection temperature of at least 500, 501, 502, 503, 504, or even 505° C. In one embodiment, the agglomerated fluoropolymer blend has an inflection temperature of at most 510, 509, 508, 507, or even 506° C. The TGA analysis can also be used to determine the amount of semi crystalline fluoropolymer particles in the agglomerated fluoropolymer blend as described in the Example Section below. In one embodiment, the agglomerated fluoropolymer blend comprises at least 10, 12, 15, or even 18 wt % and at most 20, 22, 24, 26, 28, or even 30 wt % of the semi crystalline fluoropolymer.

In one embodiment, the agglomerated fluoropolymer blend at a frequency of 0.1 Hertz and 100° C., has a modulus of less than 450, 440, 420, 410, or even 405 KPa, as described in the Example Section.

In one embodiment, the agglomerated fluoropolymer blend has an ML of less than 2.9, 2.8 or even 2.7 dNm as described in the Example Section.

The recrystallization temperature refers to the temperature at which a semi crystalline polymer in the amorphous state crystallizes when cooled. Depending on the number of crystal forms, the polymer may have one or more recrystallization points. In one embodiment, the agglomerated fluoropolymer blend has at least one recrystallization temperature of less than 310, 309, 308, 307, or even 305° C.

In one embodiment, the agglomerated fluoropolymer blend comprises at least 5, 10 or even 15%; and at most 20, 25, 30, or even 35% by weight of the semi crystalline fluoropolymer.

A curing agent may be blended with the agglomerated fluoropolymer blend to crosslink the amorphous perfluoropolymer to generate the filled perfluorinated elastomer.

Generally, the effective amount of the curing agent in the curable composition, which may include more than one curing agent, is at least 0.1, 0.5, or even 1 wt %; and below 10, 8, 6, or even 5 wt %, although higher and lower amounts of curing agent may also be used.

Curing agents can include curatives and cure catalysts. Curing agents can include those known in the art including: peroxides, triazine forming curing agent, benzimidazole forming curing agent, benzoxazole forming curing agent, adipates, and acetates, among others. These curing agents may be used by themselves or in combination with another curing agent or curing agents.

Peroxides may also be utilized as curing agents. Useful peroxides are those which generate free radicals at curing temperatures. A dialkyl peroxide or a bis (dialkyl peroxide), which decomposes at a temperature above 50° C. is especially preferred. In many cases it is preferred to use a di-tertiarybutyl peroxide having a tertiary carbon atom attached to peroxy oxygen. Peroxides selected may include: benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of amorphous perfluoropolymer.

In one embodiment, the curing agent may be selected from triazine forming cure networks. Such curing agents include: an organotin compounds (such as propargyl-, triphenyl- and allenyl-, tetraalkyl-, and tertraaryl tin curatives); ammonia generating compounds (e.g., see U.S. Pat. No. 6,281,296; ammonium salts, such as ammonium perfluorooctanoate (e.g., see U.S. Pat. No. 5,565,512); and amidines (e.g., see U.S. Pat. No. 6,846,880); imidates (e.g., see U.S. Pat. No. 6,657,013), metalamine complexes (e.g., see U.S. Pat. No. 6,657,012), and hydrochloric salts (e.g., see U.S. Pat. No. 6,794,457).

In another embodiment, the fluoropolymer blends can be cured using one or more peroxide curatives along with the ammonia generating catalysts. The cure catalyst may comprise for example, a first component and a second component wherein the first component is represented by $R'C(CF_2R)O^-Q^+$, where $Q^+$ is a non-interfering organophosphonium, organosulfonium, or organoammonium cation; each R independently represents H, halogen, a hydrocarbyl group or a halogenated hydrocarbyl group, wherein at least one carbon atom of the hydrocarbyl group may be further substituted with one or more heteroatoms selected from N, O and S; R' represents H, a hydrocarbyl group or a halogenated hydrocarbyl group, wherein at least one carbon atom of the hydrocarbyl group may be further substituted with one or more heteroatoms selected from N, O and S; or any two of R or R' may together form a divalent hydrocarbylene group, wherein at least one carbon atom of the hydrocarbylene group may be further substituted by one or more heteroatoms selected from N, O, and S, and the second component is represented by $[N\equiv CCFR'']_b Z$, wherein each R" independently represents F or $CF_3$; b represents any positive integer; and Z represents a b-valent organic moiety free of interfering groups. See e.g., U.S. Pat. No. 7,294,677. Examples include: a reaction product of $CF_3OCF_2CF_2CN$ and tetrabutylphosphonium 2-(p-toluyl)-1,1,1,3,3,3-hexafluoroisopropoxide; a reaction product of $CF_3OCF_2CF_2CN$ and tetrabutylammonium 2-(p-toluyl)-1,1,1,3,3,3-hexafluoroisopropoxide; and combinations thereof.

A catalyst comprising one or more ammonia-generating compounds may be used to cause curing. Ammonia-generating compounds include compounds that are solid or liquid at ambient conditions but that generate ammonia under conditions of cure. Such compounds include, for example, hexamethylene tetraamine (urotropin), dicyan diamid, and metal-containing compounds of the formula: $A^{w+}(NH_3)_v Y^{w-}$, where $A^{w+}$ is a metal cation such as $Cu^{2+}$, $Co^{2+}$, $Co^{3+}$, $Cu^+$, $Ni^{2+}$; w is equal to the valence of the metal cation; $Y^{w-}$ is a counterion, typically a halide, sulfate, nitrate, acetate or the like; and v is an integer from 1 to about 7.

Also useful as ammonia-generating compounds are substituted and unsubstituted triazine derivatives such as those of the formula:

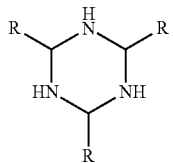

where R is a hydrogen or a substituted or unsubstituted alkyl, aryl, or aralkyl group having from 1 to about 20 carbon atoms. Specific useful triazine derivatives include: hexahydro-1,2,5-s-triazine and acetaldehyde ammonia trimer.

In one embodiment, the curing agent may be selected from the following:

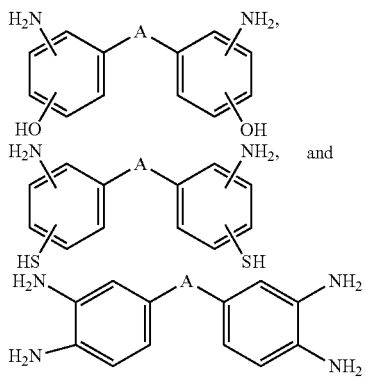

where A is $SO_2$, O, CO, alkyl of 1-6 carbon atoms, perfluoroalkyl of 1-10 carbon atoms, or a carbon-carbon bond linking the two aromatic rings, such as those disclosed in U.S. Pat. No. 6,114,452. For example, a useful curing agent may include bis(aminophenols), such as 2,2-bis[3-amino-4-hydroxyphenyl] hexafluoropropane; bis(aminothiophenols), such as 4,4'-sulfonylbis(2-aminophenol); and tetraamines, such as 3,3' diaminobenzidine; and 3,3',4,4'-tetraaminobenzophenone.

Bisamidrazone compounds for example, 2,2-bis(4-carboxyphenyl)hexafluoropropane bisamidrazone, and bisamidrazones and bisamidoximes may also be used as curing agents.

In another embodiment, curing agents (or precursors thereof) of the following formula may be used:

$$\{R(A)_n\}^{(-n)}\{QR'_k^{(+)}\}_n$$

wherein R is a $C_1$-$C_{20}$ alkyl or alkenyl, $C_3$-$C_{20}$ cycloalkyl or cycloalkenyl, or $C_6$-$C_{20}$ aryl or aralkyl, which may be nonfluorinated, partially fluorinated, or perfluorinated or hydrogen. R can contain at least one heteroatom, i.e., a non-carbon atom such as O, P, S, or N. R can also be substituted, such as where one or more hydrogen atoms in the group is replaced with Cl, Br, or I. $\{R(A)_n\}^{(-n)}$ is an acid anion or an acid derivative anion, n is the number of A groups in the anion. A is an acid anion or an acid derivative anion, e.g., A can be COO anion, $SO_3$ anion, $SO_2$ anion, $SO_2NH$ anion, $PO_3$ anion, $CH_2OPO_3$ anion, $(CH_2O)_2PO_2$ anion, $C_6H_4O$ anion, $OSO_3$ anion, O anion (in the cases where R is hydrogen, aryl, or alkylaryl),

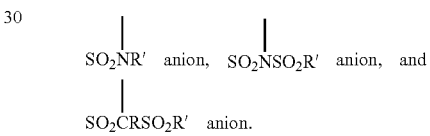

R' is defined as R (above), and a particular selection for R' may be the same or different from the R attached to A, and one or more A groups may be attached to R. Q is phosphorous, sulfur, nitrogen, arsenic, or antimony, and k is the valence of Q. When Q is nitrogen and the only fluoropolymer in the composition consists essentially of a terpolymer of tetrafluoroethylene, a perfluorovinylether, and a perfluorovinylether cure site monomer comprising a nitrile group, not every R' is H, and k is one greater than the valence of Q. (See, e.g., U.S. Pat. Nos. 6,890,995 and 6,844,388). Examples may include bistetrabutylphosphonium perfluoroadipate, tetrabutyl phosphonium acetate, and tetrabutyl phosphonium benzoate.

Other curing agents may include: bis-aminophenols (e.g., see U.S. Pat. Nos. 5,767,204 and 5,700,879); organometallic compounds (e.g., see U.S. Pat. No. 4,281,092); bis-amidooximes (e.g., see U.S. Pat. No. 5,621,145); aromatic amino compounds; bisamidrazones; bisamidoximes; and tetraphenyltin.

Depending on the cure site components present, it is also possible to use a dual cure system. For example, perfluorinated polymers having copolymerized units of nitrile-containing cure site monomers can be cured using a curing agent comprising a mixture of a peroxide in combination with organotin curative and a co-agent.

A co-agent (some times referred to as a co-curative) may be composed of a poly unsaturated compound which is capable of cooperating with the peroxide to provide a useful cure. The co-agent may be one or more of the following compounds: triallyl cyanurate; triallyl isocyanurate; tri(m- ethylallyl) isocyanurate; tris(diallylamine)-s-triazine; triallyl phosphate; N,N-diallyl acrylamide; hexaallyl phosphoramide; N,N,N',N'-tetraallyl malonamide; trivinyl isocyanurate; 2,4,6-trivinyl methyltrisiloxane; and tri(5-norbornene-2-methylene)cyanurate.

Other useful co-agents include the bis-olefins. (See e.g., EP 0 661 304 A1, EP 0 784 064 and EP 0 769 521.)

The fluoropolymer blend mixture (including the agglomerated fluoropolymer blend, curing system, and optional additives) may then be processed and shaped such as by extrusion or molding to form an article of various shapes such as sheet, a hose, a hose lining, an o-ring, a gasket, or a seal composed of the composition of the present disclosure. The shaped article may then be heated to cure the perfluoropolymer gum composition and form a cured elastomer article.

Pressing of the compounded mixture (i.e., press cure) is typically conducted at a temperature of about 120-220° C., preferably about 140-200° C., for a period of about 1 minute to about 15 hours, usually for about 1-15 minutes. A pressure of about 700-20,000 kPa, preferably about 3400-6800 kPa, is typically used in molding the composition. The molds first may be coated with a release agent and prebaked.

The vulcanizate can be post cured in an oven at a temperature of about 140-350° C., preferably at a temperature of about 200-330° C., for a period of about 1-24 hours or more, depending on the cross-sectional thickness of the sample. For thick sections, the temperature during the post cure is usually raised gradually from the lower limit of the range to the desired maximum temperature. In one embodiment, curing temperature is greater than 300° C. In one embodiment, curing temperature is higher than the melting point of the melting point of the semi crystalline fluoropolymer particles.

In one embodiment of the present disclosure, the composition comprising the perfluorinated elastomer gum or the cured perfluorinated elastomer is substantially free of a metal cations, in particular of Na, K, Mg, and Al cations, but generally of alkaline earth metal ions and alkali metal ions in general and may contain them in amounts of less than 20 ppm (parts per million) or less than 10 ppm or even less than 1 ppm. The level of alkaline- and alkaline-earth-ions (Na, K, Li, Ca, Mg, Ba) and Al may be individually below 1 ppm and in total below 4 ppm. Other ions like Fe, Ni, Cr, Cu, Zn, Mn, Co may be in total less than 4 ppm.

A particular advantage of the methods of the present disclosure is that blends of fluoroelastomers and particles can be prepared that have a low content of fluorinated emulsifier acids. Such blends may be particularly useful for applications in the semiconductor industry because not only is a low metal content required for such applications, but also desirably no acids should leak out from the fluoropolymer articles to meet the high purity requirements in semiconductor processing and production. The amorphous perfluoropolymer, the semi crystalline fluoropolymer particles, and blends thereof have very low amounts of fluorinated acids (for example, extractable $C_8$-$C_{14}$ alkanoic acids) and its salts, for example, less than 2000, 1000, 500, 100, 50, 25, or even 15 ppb (parts per billion) based on the weight of the polymer, which can be determined by extraction as described in U.S. Pat. No. 2019-0185599 (Hintzer et al.), herein incorporated by reference. The fluorinated acid corresponds to the general formula:

$$Y-R_f-Z-M$$

wherein Y represents hydrogen, Cl or F; $R_f$ represents a divalent linear or branched or cyclic perfluorinated or partially fluorinated saturated carbon chain having 8 to 14 carbon atoms; Z represents an acid group, for example a —COO⁻ or a —SO₃⁻ acid group, and M represents a cation including H⁺.

The blends comprising the amorphous perfluoropolymer and the particles of the semi crystalline fluoropolymer may be particularly useful for making seals or molds, in particular for an apparatus in the production or purification of semiconductors or products containing semiconductors including an etching apparatus and a vacuum evaporator. An etching apparatus includes a plasma etching apparatus, a reactive ion etching apparatus, a reactive ion beam etching apparatus, a sputtering etching apparatus, and an ion beam etching apparatus.

In one embodiment, the filled perfluorinated elastomeric composition (in other words, the curable or cured composition) is translucent (i.e., allowing light but no detectable shapes) or opaque (i.e., not transparent), such translucent or opaque materials may be achieved by using semi crystalline fluorinated polymers having an average diameter of greater than 100 nm.

In one embodiment, the cured perfluorinated elastomers of the present disclosure have exceptional properties including a melting point of at least 310, 315, or even 320° C. and at most 325, 330, 335, 340, 345, or even 350° C.; a having at least one recrystallization point of less than 315, 310, 300, 280, 275, 270, 265, or even 260° C.; and/or a glass transition temperature of lower than 5, 0, −5, −10, −20, −30, −40 or even −50° C.

Because of the stringent requirements related to using perfluorinated elastomers in the semiconductor industry, various test methods have been developed to predict whether or not the perfluorinated elastomer article is suitable for use. One such test method is related to weight loss, where the perfluorinated elastomer article is exposed to the plasma and the loss of weight is determined. In one embodiment, the perfluorinated elastomer of the present disclosure has a weight loss of less than 20, 10, 5, or even 1% when exposed to plasma treatment.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods.

The following abbreviations are used in this section: L=liters, mg=milligrams, g=grams, kg=kilograms, cm=centimeters, mm=millimeters, wt %=percent by weight, min=minutes, h=hours, d=days, NMR=nuclear magnetic resonance, ppm=parts per million, sccm=standard cubic centimeters, ° C.=degrees Celsius, mTorr=milliTorr, RF=radio frequency, W=watts, mol=moles. Abbreviations for materials used in this section, as well as descriptions of the materials, are provided in Table 1.

TABLE 1

| Materials | |
|---|---|
| Fluoropolymer dispersion A | Dispersion of 32.5% amorphous perfluoropolymer, which is derived from about 52.4 wt % TFE, 43.7 wt % PMVE and 3.9 wt % $CF_2$=$CFO(CF_2)_5CN$ with 72.4 wt % fluorine content, and Mooney Viscosity ML1 + 10 @ 121° C. of 71, was prepared according to Preparative Example A. |
| Fluoropolymer Dispersion B | Dispersion (50 wt % solid) of a perfluorinated thermoplastic fluoropolymer available under the trade designation PFA 6900 GZ from 3M Co., Maplewood, MN |
| Fluoropolymer dispersion C | Dispersion (25 wt % solids) of TFE/PPVE-1 copolymer having 1000 ppm PPVE-1, with an MFI = 0.4 @ 372° C./ 21.6 kg was prepared according to Preparative Example C. |
| Fluoropolymer dispersion D | Dispersion (20 wt % solids) of core-shell particles comprising TFE/PPVE was prepared according to Preparative Example D. |
| Fluoropolymer dispersion E | Dispersion (23 wt % solids) of core-shell particles comprising TFE/PPVE-1/ MV5CN was prepared according to Preparative Example E. |
| Fluoropolymer dispersion F | Dispersion (23 wt % solids) of TFE/ MA-3 copolymer having 1000 ppm MA-3 was prepared according to Preparative Example F. |
| Fluoropolymer dispersion G | Dispersion of core-shell particles comprising TFE/PPVE-1 prepared according to Preparative Example G |
| Fluoropolymer dispersion H | Dispersion of core-shell particles comprising TFE/HFP prepared according to Preparative Example H |
| Latex blend B | Fluoropolymer dispersion A/ Fluoropolymer dispersion B = 80/20 wt % based on the solid content |
| Latex blend C | Fluoropolymer dispersion A / Fluoropolymer dispersion C = 80/20 wt % based on the solid content |
| Latex blend D | Fluoropolymer dispersion A / Fluoropolymer dispersion D = 80/20 wt % based on the solid content |
| Latex blend E | Fluoropolymer dispersion A / Fluoropolymer dispersion E = 80/20 wt % based on the solid content |
| Latex blend F | Fluoropolymer dispersion A / Fluoropolymer dispersion F = 80/20 wt % based on the solid content |
| Latex blend G-1 | Fluoropolymer dispersion A / Fluoropolymer dispersion G = 80/20 wt % based on the solid content |
| Latex blend G-2 | Fluoropolymer dispersion A / Fluoropolymer dispersion G = 75/25 wt % based on the solid content |
| Latex blend H | Fluoropolymer dispersion A / Fluoropolymer dispersion H = 80/20 wt % based on the solid content |
| Catalyst A | Perfluoromethoxypropyl amidine trifluoroacetate can be prepared as described for "Catalyst A" in U.S. Pat. No. 2008 / 0021148. |
| Emulsifier | $CF_3$—O—$(CF_2)_3$—O—CHF—$CF_2$—COO$^-$$NH_4^+$, prepared as described for "Compound 1" in U.S. Pat. App. U.S. 2007 / 0015937 |

Testing of the Fluoropolymer Particles

Melting Point Measurement and Recrystallization Temperature

The Preparative Examples were coagulated and dried. The melting point ($T_m$), glass transition temperature ($T_g$), and recrystallization temperature were determined on the dry powder in accordance with ASTM D 793-01 and ASTM E 1356-98 by a differential scanning calorimetry (DSC Q2000, TA Instruments, New Castle, DE) under a nitrogen flow. The first heat cycle started at −85° C. and was ramped to 350° C. at a 10° C./minute. The cooling cycle started at 350° C. and was cooled to −85° C. at 10° C./min. The second heat cycle started at −85° C. and was ramped to 350° C. at a 10° C./minute. A DSC thermogram was obtained from the second heat of a heat/cool/heat cycle to determine $T_m$, $T_g$, and recrystallization.

Particle Size

The latex particle size determination was conducted by means of dynamic light scattering with a Malvern Zetasizer Nano S (Malvern, Worcestershire, UK) following a similar procedure to that described in DIN ISO 13321:2004-10. The reported average particle size diameter is the d50. Prior to the measurements, the polymer latexes as yielded from the polymerizations were diluted with 0.01 mol/L NaCl solution. The measurement temperature was 25° C. in all cases.

Tensile Properties

The Preparative Examples were coagulated and dried. Tests were performed with 2 mm thick test specimens for melt-processable materials and 1.6 mm thick test specimens for non melt-processable materials according to DIN EN ISO 12086-2:2006-05 and with a testing speed of 50 mm/min. Tensile strength and elongation at break were determined at 23° C. following DIN EN ISO 527-1. The results of measurements with five test specimens were averaged.

Vinyl and Allyl Ether Comonomer Content

For semi-crystalline melt-processable fluoropolymer particles, thin films of approximately 0.1 mm thickness were prepared by moulding the polymer at 350° C. using a heated plate press. For semi-crystalline non-melt-processable fluoropolymer particles, thin specimens of 0.3 to 0.4 mm thickness were prepared by cold compacting the polymer in a mould. These films were then scanned in nitrogen atmosphere using a FT-IR spectrometer (Nicolet DX 510, ThermoFisher Scientific, Waltham, MA). The OMNIC software (ThermoFisher Scientific) was used for data analysis. Herein the $CF_2$=CF—$CF_2$—O—$CF_2$—$CF_2$—$CF_3$ (MA-3) content, reported in units of weight %, was determined from an infrared band at 999 l/cm and was calculated as 1.24×the ratio (factor determined by means of solid-state NMR) of the 999 l/cm absorbance to the absorbance of the reference peak located at 2365 l/cm. The $CF_2$=CF—O—$CF_2$—$CF_2$—$CF_3$ (PPVE-1) content, reported in units of weight %, was determined from an infrared band at 993 l/cm and was calculated as 0.95×the ratio of the 993 l/cm absorbance to the absorbance of the reference peak located at 2365 l/cm. The $CF_2$=CF—O—$CF_3$ (PMVE) content, reported in units of weight %, was determined from an infrared band at 889 l/cm and was calculated as 11.2×the ratio of the 889 l/cm absorbance to the absorbance of the reference peak located at 2365 l/cm. The $CF_2$=CF—O—$(CF_2)_5$—CN (MV5CN) content, reported in units weight %, was determined from an infrared band at 2236 l/cm and was calculated as the 2.62×the ratio of the 2236 l/cm absorbance to the absorbance of the reference peak located at 2365 l/cm.

Solid Content

The solid content (fluoropolymer content) of the fluoropolymer particle dispersions was determined gravimetrically according to DIN EN ISO 12086-2:2006-05. A correction for non-volatile inorganic salts was not carried out. The solid content of the polymer dispersions was taken as polymer content.

Melt-Flow Index (MFI)

For melt-processable semi crystalline fluoropolymer particles, the MFI, reported in g/10 min, was measured according to DIN EN ISO 1133-1:2012-03 at a support weight of either 2.16 kg, 5.0 kg or 21.6 kg. The MFI was obtained with a standardized extrusion die of 2.1 mm diameter and a length of 8.0 mm. Unless otherwise noted, a temperature of 372° C. was applied.

Standard Specific Gravity (SSG)

For non-melt-processible semi crystalline fluoropolymer particles, the Preparative Examples were coagulated and dried. The SSG of the dry powder was determined following protocol of DIN EN ISO 12086-2:2006-05

Mooney Viscosity

Mooney viscosities were determined in accordance with ISO289-1:2015, 1 min pre-heat and a 10 min test at 121° C. (ML 1+10@121° C.) using a MV2000 viscometer available from Alpha Technologies, Akron, OH, USA.

Preparation of the Semi-Crystalline Fluoropolymer Particles

Preparative Example A

An oxygen-free 150 L kettle was charged with 105 kg deionized water, 2.8 kg of a 30 wt % aqueous Emulsifier solution, 56 g of ammonium chloride, 174 g ammonium nonafluorobutane-1-sulfinate (as a 34 wt % solution in water) and 214 g of a MV5CN preemulsion. The MV5CN preemulsion consists of 25 wt % MV5CN ($CF_2$=CFO$(CF_2)_5$CN available from Anles, St. Peterburg, Russia), 0.4 wt % Emulsifier (30 wt % aq. solution) and 74.6 wt % water and is prepared by mixing with a homogenizer. Afterwards the kettle was heated to 65° C. and PMVE was charged until a pressure of 10 bar was reached, followed by TFE until 14 bar. The polymerization was initiated by feeding 660 g of a 20 wt % aqueous ammonium persulfate (APS) solution. PMVE and TFE was constantly fed to the reactor while 7.45 kg of the MV5CN preemulsion was added until a total amount of 26.3 kg TFE was added. After 295 min, in total 24.1 kg PMVE, 28.3 kg TFE was added and the polymerization was stopped. The latex had a solid content of 32.5 wt % and a d50 of 79 nm. The solid polymer showed a Mooney viscosity of 71 Mooney units having about 52.4 wt % TFE, 43.7 wt % PMVE and 3.9 wt % $CF_2$=CFO$(CF_2)_5$CN.

Preparative Example C (Fluoropolymer Dispersion C)

A 40 L kettle was charged with 27 kg of oxygen-free, deionized water, 250 g of a 30 wt % of an aqueous solution of Emulsifier and 15 g PPVE-2. The kettle was heated to 65° C.; N2 was introduced up to 5 bar, followed by TFE up to 12 bar. The polymerization was initiated by feeding 6 g APS dissolved in 50 g water. After 134 min in total, 9.2 kg TFE and 20 g of PPVE-1 was fed to the reactor, the kettle was cooled down to 30° C. and the pressure was released. The final latex had a solid content of 25 wt %, an average particle size (d50) of 177 nm. The latex was used for blends, and also coagulated with a 10 wt % oxalic acid solution. the dried polymer had an MFI (372° C., 21.6 kg) of 0.4 g/10 min, an SSG of 2.195, tensile strength of 17.6 MPa and elongation of 289% (measured at 2 mm thick, sintered plates). The PPVE-1 content in the dried polymer was 0.1 wt %. The Tm and Recrystallization point of the fluoropolymer was determined as described above. Tm=326° C. and a Recrystallization point at 308° C.

Preparative Example D (Fluoropolymer Dispersion D)

An oxygen-free 40 L-kettle was charged with 27 kg deionized water, 390 g of a 30 wt % aqueous Emulsifier solution, 100 g PPVE-1 and 200 mbar Ethane (at 25° C.). Then the reactor was heated to 75° C. and TFE was charged until a pressure of 10 bar (1 MPa) was reached. The polymerization was initiated by feeding 3.0 g APS (dissolved in 50 g deionized water). TFE was constantly fed at 10 bar (1 MPa) pressure. After 5.6 kg total TFE, 280 g PPVE-1 was fed into the reactor and additional 1 g APS was added. After 7.9 kg TFE, the polymerization was stopped. The latex had a solid content of 21 wt % and a d50 of 122 nm. The coagulated, dried polymer had an PPVE-1 content of 0.8 wt % and a MFI (372° C., 5 kg) of 18 g/10 min. The Tm and Recrystallization point of the fluoropolymer was determined as described above. Tm=323° C. and a Recrystallization point at 306° C.

Preparative Example E (Fluoropolymer Dispersion E)

An oxygen-free 40 L-kettle was charged with 28 L of deionized water, 100 g of a 30 wt % aqueous Emulsifier solution, 0.9 g of a 10 wt % aqueous tert-butanol solution, 0.9 g of oxalic acid dihydrate and 82 g PPVE-1. The kettle was heated up to 40° C. and TFE was fed into the reactor to get 15 bar (1.5 MPa) pressure. The polymerization was initiated by adding 70 mg pure $KMnO_4$ (fed as 0.04 wt % aq. solution), another 70 mg $KMnO_4$ was added continuously over the whole time (133 min). After 7.7 kg TFE was added, a pre-emulsion of 50 g $CF_2$=CF—O—$(CF_2)_5$—CN and 1 g Emulsifier in 50 g water was fed to the polymerization. After a total of 8.3 kg TFE was fed into the reactor, the polymerization was terminated. The latex had a solid content of 23 wt %, d50 of 120 nm. The coagulated, dried polymer had an SSG of 2.146, PPVE content of 0.4 wt %, and a nitrile-signal at 2236 cm-1 was visible. The Tm of the fluoropolymer was determined as described above. The Tm was 328° C. and a Recrystallization point at 303° C.

Preparative Example F (Fluoropolymer Dispersion F)

An oxygen-free 40 L-kettle was charged with 28 kg of deionized water, 100 g of a 30 wt % aqueous Emulsifier solution, 7 g of a 10 wt % aqueous solution of tert-butanol, 0.9 g of oxalic acid dihydrate and 50 g of MA-3 ($C_3F_7$—O—$CF_2$—CF=$CF_2$). The kettle was heated up to 40° C. and TFE was added to reach 15 bar (1.5 MPa) pressure. The polymerization was initiated by feeding 76 mg pure KMnO$_4$ (as 0.04 wt % aq. solution) to the reactor. During the whole runtime (160 min) another 40 mg KMnO$_4$ was added. A total of 8.3 kg of TFE was added.

The final latex had a solid content of 23 wt % and d50 of 110 nm. The coagulated, dried polymer had an SSG of 2.137 and an MA-3 content of 0.06 wt %. The Tm and recrystallization temperature of the fluoropolymer was determined as described above. The Tm was 321° C. and a Recrystallization point at 306° C.

Preparative Example G (Fluoropolymer Dispersion G)

The polymer is a core shell polymer. The material is prepared by the following procedure.

Seed latex: An oxygen-free 40 L kettle was charged with 28 kg deionized water, 150 g of a 30 wt % of an aqueous Emulsifier solution, 1 g oxalic acid dihydrate, 1 g of a 50 wt % solution of tert-butanol in water and 15 g PPVE-1. At 25° C., TFE was introduced up to 15 bar (1.5 MPa) pressure. The polymerization was started with 45 mg potassium disulfite (dissolved in 100 mL water) followed by 0.015 g KMnO$_4$ (dissolved in 200 mL water) After 54 min a total of 3.2 kg TFE is added. The seed latex had an d50 of 85 nm and an SSG of 2.147.

3 L of the seed latex, 23 kg of deionized water, 60 g of a 30 wt % of an aqueous Emulsifier solution, 0.9 g oxalic acid dihydrate (dissolved in 100 mL water), 1.6 g of a 10% solution of tert-butanol in water and 10 g PPVE-1 was added to a 40 L reactor. The kettle was heated to 30° C. and TFE was fed until a pressure of 14 bar (1.4 MPa). 50 mg KMnO$_4$ (dissolved in 200 mL water) were used to start the polymerization. After 4 kg TFE were fed another 50 mg KMnO$_4$ was added. In total 8 kg TFE was added, 26 g PPVE-1 was fed until 5 kg TFE were polymerized. The latex had a solid content of 23 wt % and a d50 of 195 nm. The dried polymer showed SSG of 2.162, and a PPVE-1 content 0.07 wt %, tensile strength of 32 MPa and elongation of 385%. The Tm was 326° C. and a Recrystallization point at 308° C.

Preparative Example H (Fluoropolymer Dispersion H)

The polymer is a core shell polymer, prepared by the following procedure.

Seed latex: An oxygen-free 40 L kettle was charged with 28 kg deionized water, 300 g of a 30 wt % of an aqueous Emulsifier solution, 50 mg potassium disulfite (in 100 mL water), 6 g 25 wt % ammonia, 2 mg copper(II) sulfate (in 50 ml water) and 3 g of a 50 wt % aqueous tert-butanol solution. The kettle was heated to 35° C., 30 g HFP was added and TFE pressure was increased up to 14 bar (1.4 MPa) pressure. The polymerization was initiated with 0.36 g APS in 50 mL water. After 2.5 kg TFE were introduced, 10 g HFP were added. In total 5.8 kg TFE was transferred into the kettle. The latex had a d50 of 87 nm.

2 L of the seed latex, 26 mg of water, 150 g of a 30 wt % an aqueous solution of Emulsifier, 1 g oxalic acid dihydrate, and 1.6 g 50 wt % aqueous tert-butanol solution were fed to the reactor. The kettle was heated to 42° C., TFE was added until 14 bar (1.4 MPa). The polymerization was started by adding 30 mg KMnO$_4$ in 100 mL water. 6.5 kg TFE were added, after that 5 g HFP were added, 5 mg KMnO$_4$ and TFE was added until in total 7.1 kg TFE were reached. The latex had a d50 of 190 nm, SSG of 2.151, tensile strength of 33.6 MPa and elongation of 370%. The Tm and recrystallization point of the fluoropolymer was determined as described above. The Tm was 325° C. and a Recrystallization point at 313° C.

Latex Blends

Latex Blends B Through H

For each of Latex blends B through H, 2000 g of the undiluted Fluoropolymer dispersion A was mixed with the undiluted semi-crystalline fluoropolymer latex as indicated in Table 2 in the indicated ratio, calculated on the solid content of the latices. This mixture was agglomerated by dripping the blended latex over 30 min into a solution of 3400 g deionized water and 140 g nitric acid (65%) under stirring. The mixture was allowed to settle and then the agglomerate was filtered off and washed eight times with 8 L of deionized water. Afterwards the agglomerate was dried at 115° C. for 16 hours under vacuum. Tm was determined by DSC and the Inflection point and residual weight were determined by TGA for the dried fluoropolymer blends following the procedures below.

Melting Point for the Agglomerated Fluoropolymer Blend

Melting point ($T_m$) at $2^{nd}$ heat scan and recrystallization point at cooling scan were determined in accordance with ASTM D 793-01 and ASTM E 1356-98 by a TA Instruments differential scanning calorimetry DSC Q2000 under a nitrogen flow. A DSC scan was obtained from –50° C. to 350° C. at 10° C./min. scan rate. The first heat cycle started at –50° C. and was ramped to 350° C. at a 10° C./minute. The cooling cycle started at 350° C. and was cooled to –50° C. at 10° C./min. The second heat cycle started at –50° C. and was ramped to 350° C. at a 10° C./minute. A DSC thermogram was obtained from the first cooling of a heat/cool cycle to determine recrystallization point and a DSC thermogram was obtained from the second heat of a heat/cool/heat cycle to determine $T_m$.

Inflection point temperature and semi crystalline fluoropolymer blend ratio.

Inflection point temperature was determined using a TGA (Thermogravimetry Analysis TGA Q500 by TA Instrument) from the derivative curve in accordance with ASTM E 1131-08. The sample size for the test was 10.0±1 mg. The sample was heated to 650° C. at a 10° C./minute under a nitrogen flow and then further heated to 800° C. at a 10° C./minute under air flow. The first derivative curve of the weight loss plotted against the temperature showed two maxima. The temperature at which the minimum between these two maxima occurred was taken as the inflection point that indicated the onset of the decomposition of the semi-crystalline fluoropolymer. Inflection points are shown in Table 2. The semi crystalline fluoropolymer blend ratio was determined from the weight loss curve as the ratio of weight lost at temperatures higher than the inflection point to the total weight loss for the sample, expressed as percentage. Semi crystalline fluoropolymer blend ratios are shown in Table 2.

Extraction of Perfluorinated Alkanoic Acids:

The latex blend was freeze dried to remove the water after spiking with a surrogate recovery standard (SRS) $^{13}C_4$— PFOA (perfluorooctanoic acid having 4 of its carbon atoms replaced by $^{13}C$ isotopes; commercially available from Campro Scientific GmbH, Berlin, Germany) at a concentration of 25 ppb based on solid content of the dispersion. 1 g of the freeze-dried polymer material blend was treated with 3 ml methanol in a vial for 16 h at 250 rpm stirring speed and a temperature of 50° C.) to extract perfluorinated alkanoic acids. The mixture was centrifuged (~10 min at 4400 rpm) and an aliquot of the supernatant was transferred into a 2 ml autosampler vial.

The extract was analyzed for perfluorocarboxylic acids with reversed phase high pressured liquid chromatography (HPLC) coupled with a triple quadrupole mass spectrometer (e.g. Agilent 6460 or ABSciex API 4000 QQQ-MS) in negative Multiple Reaction Mode (MRM) using analyte typical transitions, e.g. m/z 413→369 for perfluorooctanoic acid (PFOA). The HPLC (Agilent 1200 or 1260) was equipped with an Agilent C18 column (Zorbax Eclipse XDB-C18 4.6×50 mm 1.8 µm) and run in gradient mode with high purity water and methanol at 50° C., both solvents were LC-MS grade and modified with 10 mmol ammonium acetate (gradient 15% MeOH→100% MeOH). The analytes were quantified using equivalent or similar isotope labelled internal standards (e.g. $^{13}C_8$—PFOA as internal standard for PFOA, available from Campro Scientific GmbH, Berlin, Germany) in a calibration range of 0.5-200 ng/ml analyte in methanolic extract, resulting in a lower level of quantification (LLOQ) related to polymer of 1.5 ppb and an upper limit of quantification (ULOQ) of 600 ppb. Analytes with concentrations higher than ULOQ were diluted with methanol into the calibration range and the analysis was repeated. The amounts for perfluorinated $C_8$- to $C_{14}$-carboxylic acids ($CF_3$—$(CF)_n$COOH; n=6-12) were determined this way.

The designated blends in above Table 2, which comprised the agglomerated fluoropolymer, were compounded as follows: 100 g of the designated blend with 1.1 g of Catalyst A were prepared using a 6 inch (15.24 cm) two roll mill. The compounded materials were characterized by measurement of modulus, visual observation of milled sheets, cure rheology, and compression set, according to the procedures described below.

Visual Inspection of Compounded Materials

After mixing on the mill was complete, the blend was removed from the roll by cutting. The appearance of the resulting sheets was visually inspected. The visual appearance of the entire sheet was reported as either appearing smooth or rough. The presence of fibrillation was determined by visually inspecting the sheet for the appearance of white lines in the sheet and reported as none, little, or significant amount present. The visual observations for each sample are reported in Table 3.

Modulus of Compounds and Frequency Sweep

Modulus at 100° C. was determined using a rheometer (RPA 2000 by Alpha Technologies, Hudson, OH) at a strain of 7% and a frequency sweep of 0.1, 2.0 and 20 Hz from the storage modulus (G'), which is obtained from ASTM 6204-

TABLE 2

|  | EX-1 | EX-2 | EX-3 | EX-4 | CE-1 | EX-5 | EX-6 | CE-2 |
| --- | --- | --- | --- | --- | --- | --- | --- | --- |
| Blend Designation | C | D | E | F | H | G-1 | G-2 | B |
| Fluoropolymer Dispersion A | 80 | 80 | 80 | 80 | 80 | 80 | 75 | 80 |
| Fluoropolymer Dispersion B |  |  |  |  |  |  |  | 20 |
| Fluoropolymer Dispersion C | 20 |  |  |  |  |  |  |  |
| Fluoropolymer Dispersion D |  | 20 |  |  |  |  |  |  |
| Fluoropolymer Dispersion E |  |  | 20 |  |  |  |  |  |
| Fluoropolymer Dispersion F |  |  |  | 20 |  |  |  |  |
| Fluoropolymer Dispersion G |  |  |  |  |  | 20 | 25 |  |
| Fluoropolymer Dispersion H |  |  |  |  | 20 |  |  |  |
| Tm of the semi-crystalline fluoropolymer (° C.) | 326 | 323 | 328 | 321 | 325 | 326 | 326 | 308 |
| Recrystallization of the semi-crystalline fluoropolymer (° C.) | 308 | 306 | 303 | 306 | 313 | 308 | 308 | 285 |
| DSC of the blend | | | | | | | | |
| $T_m$ (° C.) | 325 | 322 | 329 | 322 | 330 | 326 | 326 | 305 |
| Recrystallization (° C.) | 304 | 304, 272 | 302 | 306 | 314 | 310 | 304, 310 | 264, 281 |
| TGA of the blend | | | | | | | | |
| Inflection point (° C.) | 504 | 505 | 505 | 510 | 510 | 507 | 508 | 499 |
| semi crystalline fluoropolymer blend ratio (%) | 21 | 18 | 20 | 20 | 20 | 20 | 25 | 22 |
| Sum of C8-C14 perfluorinated alkanoic acids, (ppb) | <100 | <100 | <100 | <100 | <10 | <100 | <100 | 830 |

07 Part A. The sample size for the test was 7.0±0.1 grams. Pre-conditioning step was done before modulus measurement at 0.5 Hz, 62.8% strain, and 100° C. for 5 minutes. Results are reported in Table 3.

Cure Rheology

The cure characteristics of the compounded material were measured using a rheometer (Rubber Process Analyzer with Moving Die Rheometer (MDR) mode, Alpha Technologies, Hudson, OH) under conditions corresponding to ASTM D5289-07. Cure rheology tests were carried out using uncured, compounded samples at 160° C., no pre-heat, 15 minutes elapsed time, and a 0.5 degree arc. Both the minimum torque ($M_L$) and highest torque attained during a specified period of time when no plateau or maximum torque ($M_H$) was obtained were measured. Also measured were the time for the torque to increase 2 units above $M_L$ ($t_s2$), the time for the torque to reach a value equal to $M_L+0.1(M_H-M_L)$, (t' 10), the time for the torque to reach a value equal to $M_L+0.5(M_H-M_L)$, (t'50), and the time for the torque to reach $M_L+0.9(M_H-M_L)$, (t'90).

Compression Set

O-rings (214, AMS AS568) were molded from the compounded material at 160° C. for 15 minutes. The press-cured O-rings were post-cured at the following step cure procedure. The first step cure started at room temperature and was ramped to 150° C. for 2 hours. It was held at 150° C. for 7 hours. The second step cure started at 150° C. and was ramped to 300° C. for 2 hours. It was held at 325° C. for 8 hours. Then cooling step started at 325° C. and was cooled to room temperature for 2 hours. The post-cured O-rings were tested for compression set for 70 hours at 300° C. and 325° C. in accordance with ASTM D 395-03 Method B and ASTM D 1414-94 with 25% initial deflection. Results are reported as percentages. The compression set results are summarized in Table 3.

Example 7

The post cured O-ring from Example 2 was then tested using DSC to determine the Tm and Tg and recrystallization following a similar procedure as described above for the Melting point measurement and Recrystallization temperature. The second heat of the heat/cool/heat cycle showed a Tm of 321.9° C., a Tg of −3° C., and from the first cooling, recrystallization points of 269.3° C. and 285° C.

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A latex blend comprising an amorphous perfluoropolymer latex and an aqueous dispersion of semi crystalline fluoropolymer particles, wherein the semi crystalline fluoropolymer particles comprise a tetrafluoroethylene copolymer wherein the tetrafluoroethylene copolymer is derived from (a) tetrafluoroethylene and (b) greater than zero and no more than 1 wt % of a fluorinated vinyl ether monomer, a fluorinated allyl ether monomer, or combinations thereof, wherein the semi crystalline fluoropolymer particles (i) have a melt flow index (372° C. with 2.16 kg) of less than 50 g/10 min or (ii) are not melt processible and have an standard specific gravity of less than 2.200, and wherein the semi crystalline fluoropolymer particles have an average diameter greater than 100 nm and wherein the latex blend after agglomeration and drying, comprises less than 500 ppb of extractable C8-C14 fluorinated alkanoic acids.

TABLE 3

| | EX-1 | EX-2 | EX-3 | EX-4 | CE-1 | EX-5 | EX-6 | CE-2 |
| --- | --- | --- | --- | --- | --- | --- | --- | --- |
| Frequency sweep @100° C. | | | | | | | | |
| 0.1 Hz (KPa) | 487 | 392 | 456 | 402 | 670 | 471 | 483 | 436 |
| 2 Hz (KPa) | 961 | 898 | 908 | 857 | 1219 | 934 | 967 | 997 |
| 20 Hz (KPa) | 1355 | 1285 | 1294 | 1222 | 1712 | 1292 | 1341 | 1395 |
| Appearance of milled sheet | rough | smooth | rough | smooth | rough | rough | smooth | smooth |
| Fibrillation | little | none | little | none | significant | little | none | none |
| MDR (15 min@160° C.) | | | | | | | | |
| ML (dNm) | 3.0 | 2.5 | 4.1 | 2.7 | 5.6 | 3.8 | 3.8 | 2.5 |
| MH (dNm) | 8.2 | 8.3 | 9.8 | 7.9 | 11.0 | 8.8 | 9.8 | 10.0 |
| delta torque (dNm) | 5.2 | 5.9 | 5.7 | 5.2 | 5.4 | 5.0 | 6.0 | 7.4 |
| ts2 (min) | 2.7 | 2.5 | 2.5 | 2.8 | 2.6 | 3.0 | 2.4 | 2.3 |
| t50 (min) | 3.1 | 3.2 | 3.2 | 3.2 | 3.1 | 3.4 | 3.1 | 3.3 |
| t90 (min) | 9.6 | 9.5 | 9.6 | 9.7 | 9.8 | 9.7 | 9.5 | 9.5 |
| tan d ML | 0.63 | 0.78 | 0.60 | 0.69 | 0.57 | 0.647 | 0.664 | 0.840 |
| tan d MH | 0.175 | 0.176 | 0.200 | 0.186 | 0.207 | 0.210 | 0.186 | 0.154 |
| Compression test (%) 70 hours @300° C. | | | | | | | | |
| 25% deflection | — | 63 | — | 62 | — | — | — | 62 |
| 70 hours @325° C. | | | | | | | | |
| 25% deflection | — | 72 | — | 64 | — | — | — | 78 |

— unable to mold uniform thickness O-rings

2. The latex blend of claim 1, wherein the latex blend, after agglomeration and drying, has a melting temperature of at least 310° C. and at most 329° C.

3. The latex blend of claim 1, wherein the latex blend, after agglomeration and drying, has an inflection point temperature of at least 500° C. and at most 510° C.

4. The latex blend of claim 1, wherein the latex blend, after agglomeration and drying, has at least one recrystallization temperature less than 310° C.

5. The latex blend of claim 1, wherein the additional fluorinated monomer is an unsaturated perfluorinated ether selected from the general formula:

$$R_f\text{—}O\text{—}(CF_2)_m CF\text{=}CF_2$$

wherein m is 0 or 1 and Rf represents a perfluoroalkyl residue containing from at least 1 carbon atoms which may be interrupted by at least one catenated oxygen atom.

6. The latex blend of claim 1, wherein the semi crystalline fluoropolymer particles are core-shell particles.

7. The latex blend of claim 1, wherein the latex blend comprises at least 5 wt % and no more than 50 wt % of the semi crystalline fluoropolymer particles per the amorphous perfluoropolymer based on weight.

8. The latex blend of claim 1, wherein the latex blend, after agglomeration and drying, comprises at least 10 to at most 30 wt % of the semi crystalline fluoropolymer particles.

9. The latex blend of claim 1, wherein the latex blend composition is substantially free of metal.

10. The latex blend of claim 1, wherein the semi crystalline fluoropolymer particles have a standard specific gravity of at most 2.185.

11. The latex blend of claim 1, wherein the amorphous perfluoropolymer latex comprises particles of amorphous perfluoropolymer having an average particle diameter of at least 50 nm to at most 200 nm.

12. The latex blend of claim 1, wherein the tetrafluoroethylene copolymer is derived from (a) tetrafluoroethylene and (b) greater than zero and no more than 1 wt % of a perfluorinated vinyl ether monomer, a perfluorinated allyl ether monomer, or combinations thereof.

* * * * *